(12) United States Patent
Krause et al.

(10) Patent No.: US 11,683,004 B2
(45) Date of Patent: Jun. 20, 2023

(54) CABLE AND POLE SUPPORTED SOLAR PANEL ARRAY

(71) Applicant: RUTE FOUNDATION SYSTEMS, INC., Portland, OR (US)

(72) Inventors: Doug Krause, Portland, OR (US); Louis Wood, Wallingford (GB)

(73) Assignee: RUTE FOUNDATION SYSTEMS, INC., Portland, OR (US)

( * ) Notice: Subject to any disclaimer, the term of this patent is extended or adjusted under 35 U.S.C. 154(b) by 0 days.

(21) Appl. No.: 17/380,469

(22) Filed: Jul. 20, 2021

(65) Prior Publication Data

US 2022/0021332 A1 Jan. 20, 2022

Related U.S. Application Data

(60) Provisional application No. 63/053,968, filed on Jul. 20, 2020.

(51) Int. Cl.
*H02S 20/32* (2014.01)
*H02S 20/10* (2014.01)
(Continued)

(52) U.S. Cl.
CPC ............ *H02S 20/32* (2014.12); *F24S 30/48* (2018.05); *H02S 20/10* (2014.12); *F24S 25/10* (2018.05);
(Continued)

(58) Field of Classification Search
CPC .......... H02S 20/32; H02S 20/10; F24S 30/48; F24S 25/10; F24S 2030/17; F24S 2030/133; F24S 2030/136
See application file for complete search history.

(56) References Cited

U.S. PATENT DOCUMENTS

| 7,000,608 B2 | 2/2006 | Loschmann |
| 8,448,390 B1 | 5/2013 | Clemens |

(Continued)

FOREIGN PATENT DOCUMENTS

| CN | 101976976 B | 2/2011 |
| CN | 201732794 U | 2/2011 |

(Continued)

OTHER PUBLICATIONS

International Search Report and Written Opinion, International Patent Application No. PCT/IB2021/056560, dated Oct. 20, 2021 (10 pages).

*Primary Examiner* — Bethany L Martin
(74) *Attorney, Agent, or Firm* — Hamre, Schumann, Mueller & Larson, P.C.

(57) ABSTRACT

A solar panel assembly where a solar panel(s) is mounted on a support pole that is pivotally attached to a footing. By adjusting the angle of the support pole relative to ground, the orientation of the solar panel can be changed in full-axis directions. A plurality of the solar panel assemblies can be arranged into an array of rows and columns. Each row includes a row support cable that is connected to each one of the solar panel assemblies in the row to simultaneously adjust an angle of each of the solar panels in the row. In addition, each column includes a column support cable that is connected to each one of the solar panel assemblies in the column which may be used to simultaneously adjust an angle of each of the solar panels in the column.

10 Claims, 9 Drawing Sheets

(51) Int. Cl.
  *F24S 30/48* (2018.01)
  *F24S 25/10* (2018.01)
  *F24S 30/00* (2018.01)

(52) U.S. Cl.
  CPC .... *F24S 2030/133* (2018.05); *F24S 2030/136* (2018.05); *F24S 2030/17* (2018.05)

(56) References Cited

U.S. PATENT DOCUMENTS

| | | |
|---|---|---|
| 8,459,249 B2 | 6/2013 | Corio |
| 9,995,506 B2 | 6/2018 | Doyle |
| 10,103,685 B2 | 10/2018 | Menard |
| 2004/0245782 A1* | 12/2004 | Loschmann .......... F24S 30/452 290/1 R |
| 2011/0073160 A1 | 3/2011 | Lu |
| 2015/0377520 A1* | 12/2015 | Kufner .................. F24S 30/425 126/605 |
| 2017/0194894 A1 | 7/2017 | Conger |
| 2017/0250650 A1 | 8/2017 | Iwasaki et al. |
| 2017/0318921 A1* | 11/2017 | Gharabegian ......... F24S 30/452 |
| 2020/0127597 A1* | 4/2020 | Reboldi .................. H02S 20/10 |
| 2020/0195191 A1* | 6/2020 | Melton ................. F24S 30/455 |
| 2021/0336579 A1* | 10/2021 | Sun ......................... F24S 30/42 |

FOREIGN PATENT DOCUMENTS

| | | |
|---|---|---|
| EP | 2154449 A2 | 2/2010 |
| EP | 2837899 A1 | 2/2015 |
| ES | 2453501 T3 | 4/2014 |
| JP | 2012069610 A | 4/2012 |
| JP | 2019-097368 A | 6/2019 |
| KR | 101004108 B1 | 12/2010 |
| WO | 2009013607 | 1/2009 |

\* cited by examiner

CABLE AND POLE SUPPORTED SOLAR PANEL ARRAY

FIELD

This technical disclosure relates to a mechanical support system for an array of solar panels that generate electrical energy from the sun.

BACKGROUND

Traditional solar panel arrays comprise large banks of solar panels. Many types of mechanical support systems for solar panels are known. One type of mechanical support system can be referred to as "fixed" supports that typically align the solar panels toward the noon sun direction. Another type of support system is referred to as "single-axis" supports that articulate the solar panels from east to west to permit tracking of the sun's daily arc. In general, single-axis mechanical support systems allow for up to about 20% more electricity than fixed mechanical support systems. "Dual-axis" or "full axis" support systems articulate the solar panels in a manner to permit the solar panels to track the sun's east-west daily arc and the sun's north-south seasonal arc. Dual and full axis mechanical support systems require significantly more land space and only provide about 5% more electrical generation than single-axis support systems. Accordingly, conventional dual-axis or full axis trackers are generally not considered cost competitively advantageous over single-axis support systems.

In traditional mechanical support systems, the solar panels are mounted relatively close to the ground, rendering the land underneath the solar panels unavailable for practical use such as for grazing of animals or growing grass or other vegetation. In addition, solar panels that are close to the ground tend to accumulate dust, dirt and other debris more frequently.

SUMMARY

A solar panel assembly is described where a solar panel is mounted on a support pole that is attached to a footing via an articulating connection that permits the support pole to articulate relative to the footing. The articulating connection may be a connection that provides universal articulation of the support pole relative to the footing. By adjusting the angle of the support pole relative to ground, the orientation of the solar panel can be changed to track the movements of the sun. In one embodiment, two separate adjustment mechanisms can be connected to the support pole to permit adjustment of the support pole, and the solar panel mounted thereon, relative to the ground to track the sun's east-west daily arc and the sun's north-south seasonal arc.

In an embodiment, each solar panel is mounted on a support pole for vertical support, and horizontal support is provided by a pair of support cables connected to, for example, the support pole. The support poles may be articulated to the ground. The support cables may extend generally east-west and north-south whereby in a top view, the support cables are arranged relative to one another at an angle of at least 45 degrees and less than about 135 degrees, for example about 90 degrees.

The use of support poles and support cables as described provides a number of benefits. For example, the solar panels can be supported higher off the ground. For example, in one embodiment, the vertically lowest support cable can be 8-15 feet above the ground, or 10 feet above the ground, and no portion of the solar panel extends below the vertically lowest support cable. This permits the ground underneath the solar panels to be used, for example for animal grazing or growing vegetation such as grass. Growing of vegetation under the solar panels further reduces heat that impinges on the solar panels and reduces dust. The height also permits people, animals and/or vehicles to pass underneath the solar panels and the support cables. In addition, the solar panels described herein have a reduced tendency to accumulate dirt, dust and other debris. Further, the support poles and the support cables reduce the costs associated with supporting and adjusting the orientation of the solar panels compared to traditional support and adjustment mechanisms used in solar arrays.

In an embodiment, a solar panel system can include a solar panel having a plurality of photovoltaic cells, and a support pole having a first end attached to the solar panel and a second end that is mounted to a ground footing via an articulating connection that permits the support pole to articulate relative to the ground footing. In addition, the solar panel is mounted to permit the solar panel to track the sun's daily arc.

In another embodiment, a solar panel system can include a plurality of solar panel assemblies arranged into an array having a plurality of rows and columns. Each one of the solar panel assemblies can include a solar panel having a plurality of photovoltaic cells, and the solar panel assemblies in the array are spaced apart from each other so that the solar panel of each one of the solar panel assemblies is not directly physically in contact with the solar panel of any other one of the solar panel assemblies and there is an open space between each adjacent pair of the solar panels. In addition, each solar panel assembly can include a support pole having a first end attached to the solar panel and a second end that is mounted to a ground footing. Each row includes a row support cable that is connected to each one of the support poles therein, and each column includes a column support cable that is connected to each one of the support poles therein.

In another embodiment, a plurality of the solar panel assemblies can be arranged into an array having a plurality of rows and columns. Each row can include a row adjustment mechanism that is connected to each one of the solar panel assemblies in the row in a manner to simultaneously adjust an angle of each of the support poles, and therefore the solar panels, in the row. In addition, each column includes a column adjustment mechanism that is connected to each one of the solar panel assemblies in the column in a manner to simultaneously adjust an angle of each of the support poles, and therefore the solar panels, in the column.

In another embodiment described herein, a solar panel system can include a solar panel having a plurality of photovoltaic cells, and a support pole having an upper or first end attached to the solar panel and a lower or second end that is mounted to a footing via an articulating connection that permits the support pole to articulate relative to the footing. The footing can be disposed on the ground whereby the solar panel is ground supported. In another embodiment, the footing and the solar panel system can be mounted on a building, for example at the top of the building.

In another embodiment described herein, a solar panel system can include a plurality of solar panel assemblies arranged into an array having a plurality of rows and columns. Each one of the solar panel assemblies includes a solar panel having a plurality of photovoltaic cells. The solar panel assemblies in the array are spaced apart from each other so that the solar panel of each one of the solar panel assemblies is not directly physically in contact with the solar panel of any other one of the solar panel assemblies and there is an open space between each adjacent pair of the solar panels. In addition, each row includes a row adjustment mechanism including, but not limited to, a row support cable (which can also be referred to as a row adjustment cable in this embodiment), that is connected to each one of the solar panel assemblies therein in a manner to simultaneously adjust an angle of each of the solar panels in the row. In addition, each column includes a column adjustment mechanism including, but not limited to, a column support cable (which can also be referred to as a column adjustment cable in this embodiment), that is connected to each one of the solar panel assemblies therein in a manner to simultaneously adjust an angle of each of the solar panels in the column.

DRAWINGS

DETAILED DESCRIPTION

Figure 1:
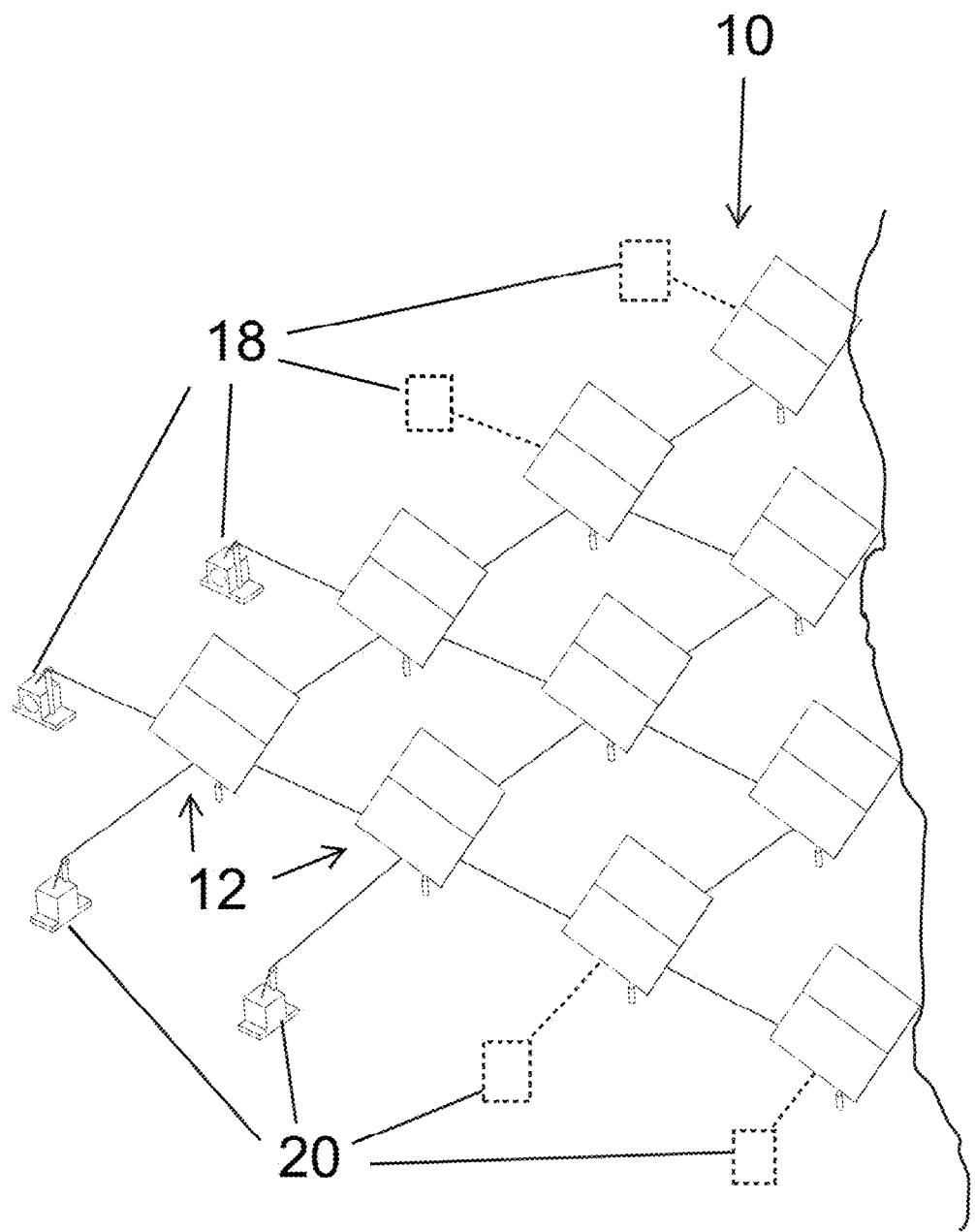
FIG. 1 is a perspective view of a portion of an array of solar panel assemblies arranged into rows and columns.
Figure 2:
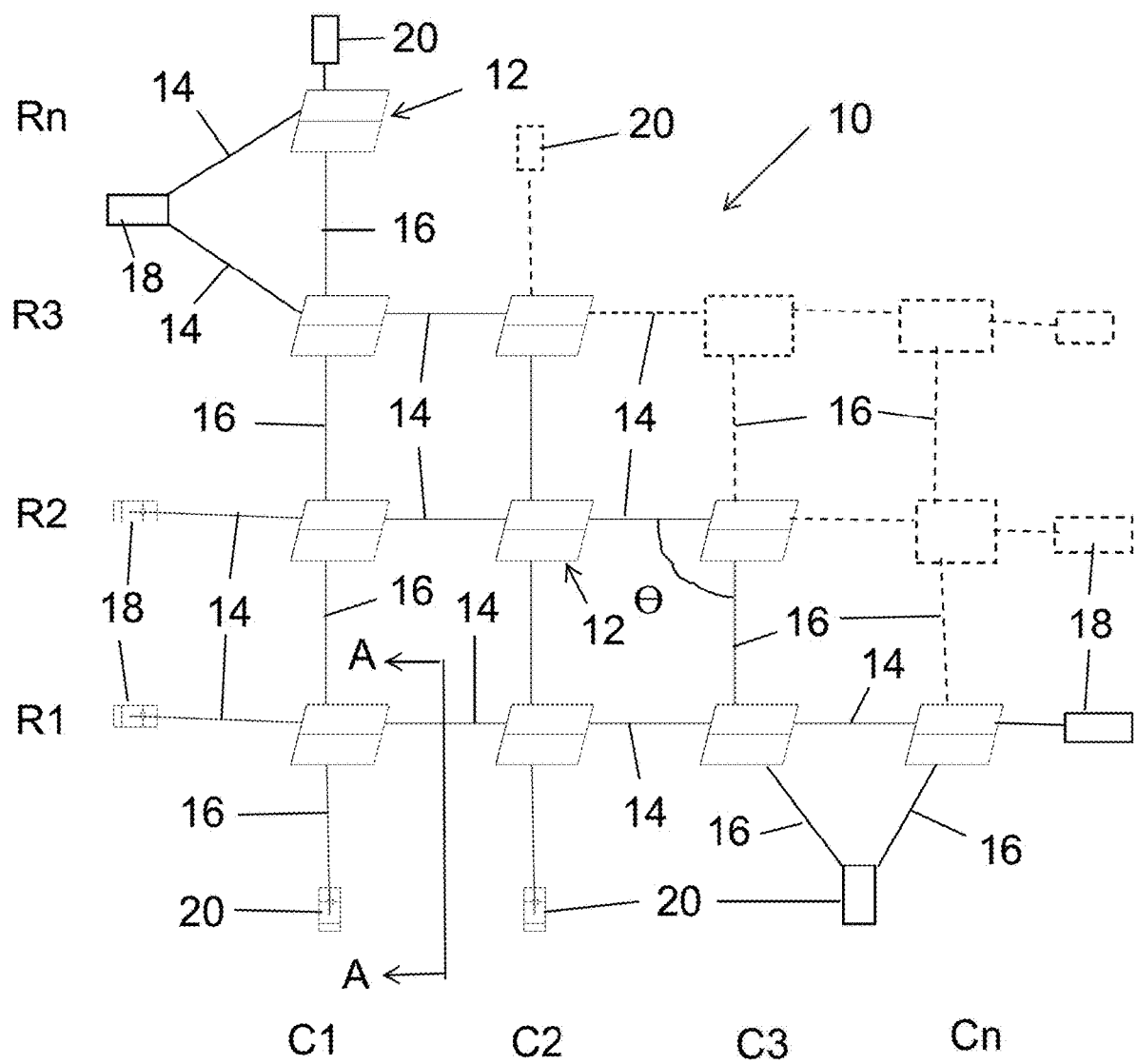
FIG. 2 is a top view of an array of solar panel assemblies described herein arranged into rows and columns.

Referring to FIGS. 1 and 2, a portion of an array 10 of solar panel assemblies 12 of a solar panel system is illustrated. The solar panel assemblies 12 are arranged into a plurality of rows R1, R2, ... Rn and a plurality of columns C1, C2, ... Cn. In the following description, any row in the array 10 may be referenced using R, and any column in the array 10 may be referenced using C. The example depicted in FIGS. 1 and 2 shows four rows R and four column C, and only some of the solar panel assemblies 12 in some of the rows R and columns C are illustrated. However, the array 10 can include a smaller or larger number of rows and columns including a single row R with multiple columns C and a single column C with multiple rows R. In addition, in some embodiments, a single one of the solar panel assemblies 12 described herein can be used by itself without any other ones of the solar panel assemblies 12.

Each row R includes an adjustment mechanism for simultaneously adjusting the orientations of all of the solar panel assemblies 12 in each row. In addition, each column C includes an adjustment mechanism for simultaneously adjusting the orientations of all of the solar panel assemblies 12 in each column. The adjustment mechanisms for the rows R and the columns C can have any construction that is suitable for simultaneously adjusting the orientations of all of the solar panel assemblies 12 in each row R and column C. For example, as described in further detail below, the adjustment mechanisms can include a row support cable 14 (which can also be referred to as a row adjustment cable 14 when the cable 14 performs a row adjustment function) for each row C and a column support cable 16 (which can also be referred to as a column adjustment cable 16 when the cable 16 performs a column adjustment function) for each column C. In each row R and in each column C, the cables 14, 16 are connected to each solar panel assembly 12 and provide horizontal support for the assemblies 12 and, in this embodiment, the cables 14, 16 are also used to adjust the orientation of each solar panel assembly 12.

Each row support cable 14 extends from the first solar panel assembly 12 in a particular row R to the last solar panel assembly 12 in the row R. Each row support cable 14 can be a single piece of cable or each cable 14 can be formed by separate pieces that together interconnect all of the solar panel assemblies 12 in the row R to achieve simultaneous adjustment of the solar panel assemblies 12 in the row R. Similarly, each column support cable 16 extends from the first solar panel assembly 12 in a particular column C to the last solar panel assembly 12 in the column C. Each column support cable 16 can be a single piece of cable or each cable 16 can be formed by separate pieces that together interconnect all of the solar panel assemblies 12 in the column C to achieve simultaneous adjustment of the solar panel assemblies 12 in the column C.

In one embodiment, the row support cables 14 can run substantially in an East-West direction, while the column support cables 16 can run substantially in a North-South direction. However, the cables 14, 16 can extend in other directions. In addition to providing horizontal support, the row support cables 14 adjust the solar panel assemblies 12 generally east-west to track the sun's daily arc, while the column support cables 16 adjust the solar panel assemblies 12 generally north-south to track the suns seasonal arc. In addition, the cables 14, 16 allow the solar panel assemblies 12 to articulate to the ground as described further below.

With continued reference to FIG. 2, a plurality of row adjusters 18 are attached to the row support cables 14 at each end of each row R, and a plurality of column adjusters 20 are attached to the column support cables 16 at each end of each column C. There can be one of the row adjusters 18 at each end of the support cable 14 for each row R, or a row adjuster 18 can serve multiple rows R (as depicted in FIG. 2). Similarly, there can be one of the column adjusters 20 at each end of the support cable 16 for each column C, or a column adjuster 20 can serve multiple columns C (as depicted in FIG. 2). The row adjusters 18 and the column adjusters 20 can each be controlled by a single common controller (not shown), there can be a controller for each adjuster 18, 20, or multiple controllers can be provided with each controller controlling multiple ones of the adjusters 18, 20. In operation, the adjusters 18, 20 at one end of a row R or column C reel the row and column support cables 14, 16 in and out under operation of a controller. The adjusters 18, 20 at the opposite ends maintain tension in the support cables 14, 16 as the cables 14, 16 are being pulled by the other adjusters 18, 20 in the row R or column C. The actuation of the support cables 14, 16 adjusts the angles of the solar panel assemblies 12 in the row R and/or column C and keep the solar panel of each solar panel assembly 12 oriented toward the sun.

Referring to FIGS. 1 and 2, the row support cables 14 and the column support cables 16 can be arranged relative to one another at an angle ⊖. The angle ⊖ can be any angle that allows the angles of the solar panel assemblies 12 in the rows R and column C to be adjusted as described herein. For example, the angle Θ can be between about 45 degrees to about 135 degrees. In an embodiment, the angle Θ can be about 90 degrees.

The solar panel assemblies 12 can be configured and connected to the support cables 14, 16 in any manner that permits the orientations of the solar panel assemblies 12 to be adjusted via the support cables 14, 16 being reeled in and out by the adjusters 18, 20. In the example described further below and illustrated in FIG. 3, each solar panel assembly 12 includes a solar panel 30 that is mounted on a tiltable support pole 32 that is connected to the support cables 14, 16 which control the angle of tilt of the support pole 32.

Figure 3:
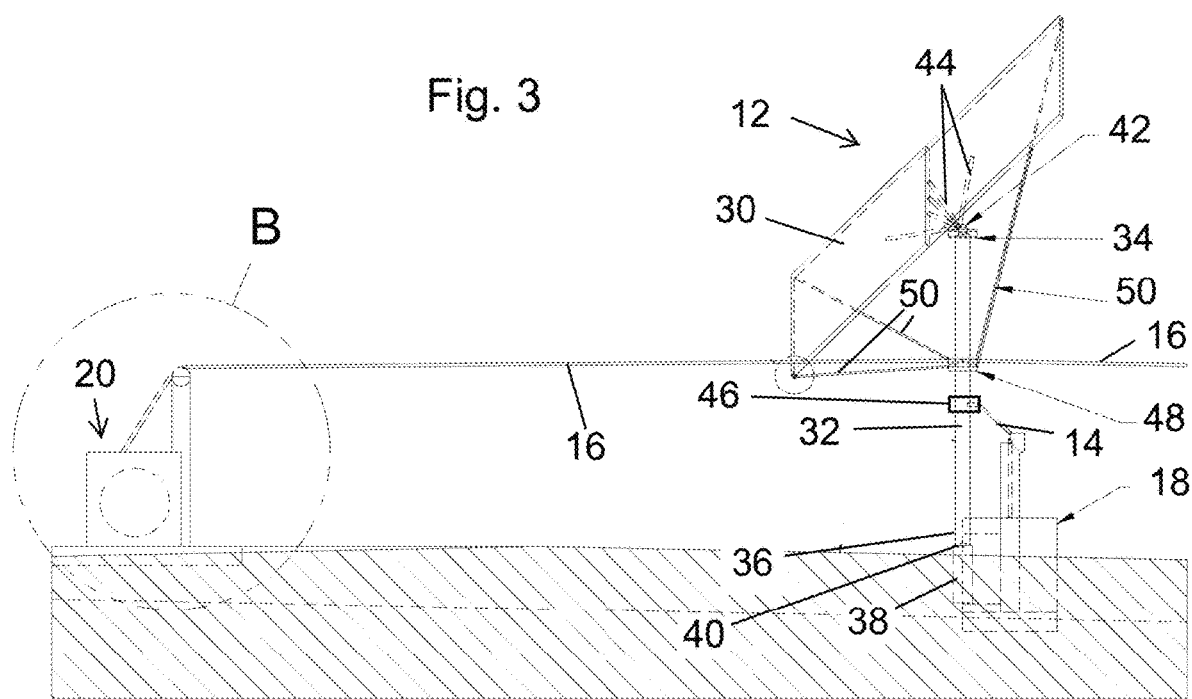
FIG. 3 is a side view looking in the direction of line A-A in FIG. 2 illustrating one solar panel assembly and a portion of a column adjustment mechanism.
Figure 5:
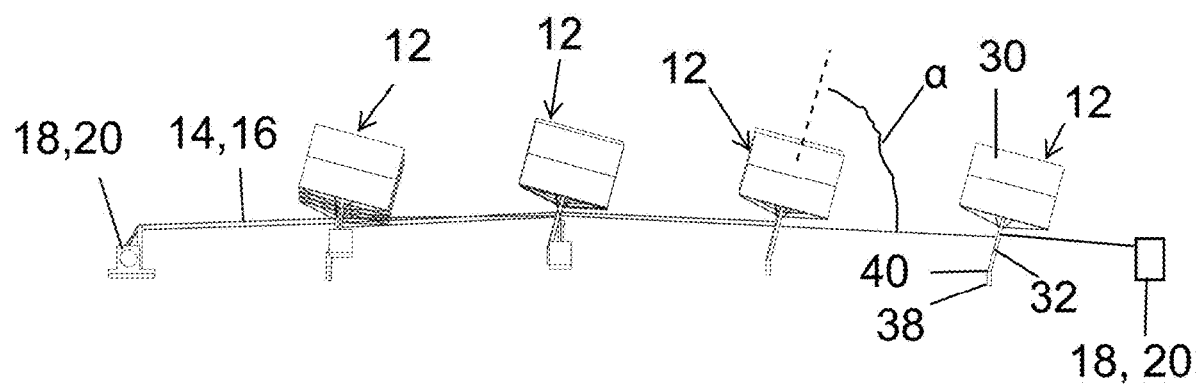
FIG. 5 is a side view of a row or column in the array of FIGS. 1 and 2 depicting simultaneous adjustment of the solar panel assemblies.

Referring to FIGS. 3 and 5, the solar panel 30 can be of conventional construction including a plurality of photovoltaic cells mounted in a rack. The support pole 32 has an upper or first end 34 attached to the solar panel 30 and a lower or second end 36 that is mounted to a ground footing 38 via a lower articulating connection 40 that permits the support pole 32 to articulate relative to the footing 38. The lower articulating connection 40 can be any type of connection that permits tilting of the support pole 32 relative to the footing 38 about two or more axes. In one embodiment, the lower articulating connection 40 can be of a type that provides universal articulation of the support pole 32 relative to the footing 38. Examples of the lower articulating connection 40 that can be used include, but are not limited to, a ball and socket type connection, a universal joint, and the like.

The upper end 34 of the support pole 32 may also be attached to the solar panel 30 by an upper articulating connection 42 that permits the solar panel 30 to articulate relative to the support pole 32. The upper articulating connection 42 can be any type of connection that permits tilting of the solar panel 30 relative to the support pole 32 about two or more axes. In one embodiment, the upper articulating connection 42 can be of a type that provides universal articulation of the solar panel 30 relative to the support pole 32. Examples of the upper articulating connection 42 that can be used include, but are not limited to, a ball and socket type connection, a universal joint, and the like.

Referring to FIG. 3, brackets 44 connect the solar panel 30 to the upper end 34, for example to the upper articulating connection 42. The support pole 32 can further include a first cable retainer 46 and a second cable retainer 48 mounted thereon. In the depicted example, the first cable retainer 46 and the second cable retainer 48 are spaced from one another in a longitudinal direction of the support pole 32. The cable retainers 46, 48 provide a location to secure the support cables 14, 16, respectively, to the support pole 32. The cable retainers 46, 48 can have any configuration that is suitable securing the support cables 14, 16 to the support pole 32. For example, the cable retainers 46, 48 can be pole collars. In another embodiment, each support pole 32 can include a single cable retainer that is secured to both of the support cables 14, 16. Tie downs 50 can extend from the solar panel 30 to the cable retainer 48 or anywhere else on the support pole 32 to help secure the solar panel 30 to the support pole 32.

Figure 4:
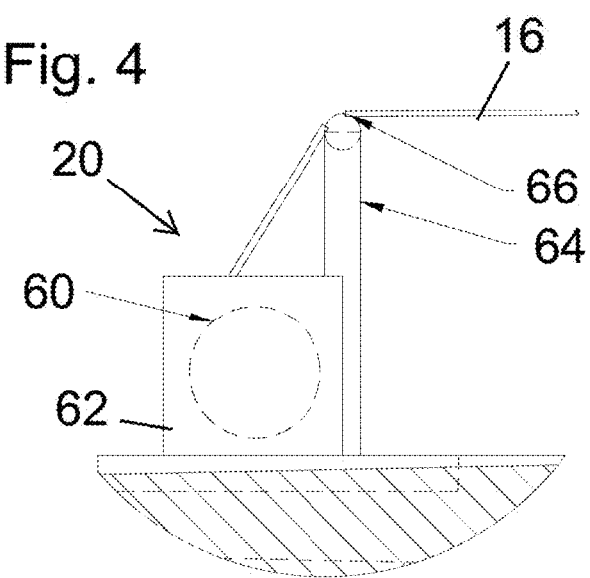
FIG. 4 is a detail view of the portion contained in the circle B in FIG. 3.

Referring to FIGS. 3 and 4, details of one of the column adjusters 20 are illustrated. The row adjusters 18 have an identical construction and are not separately described. The column adjusters 20 can include a cable spool 60 around which the column support cable 16 is wound. The spool 60 can be disposed inside a housing 62 that houses a two-way drive motor (not shown) connected to the spool 60 for driving the spool 60 in forward and reverse directions, and a controller (not shown) for controlling operation of the drive motor. A post 64 projects above the housing 62 and a pulley 66 is mounted on the post 64. The cable 16 extends from the spool 60 over the pulley 66 and then on to the first solar panel assembly 12 in the column C.

Figure 6:
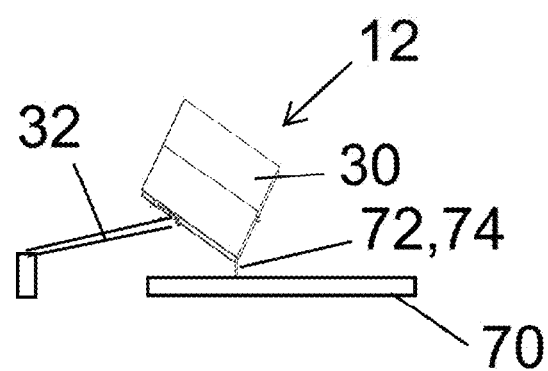
FIG. 6 is a side view of a solar panel assembly illustrating the solar panel assembly tilted downward to a non-use position.

Referring to FIG. 6, each solar panel assembly 12 can be associated with a ground pad 70 that is disposed on the ground and supports the solar panel 30 when the solar panel assembly 12 is tilted downward to a non-use position. Tilting of the solar panel 30 to the non-use position can be useful for maintenance on the solar panel 30 or on the support pole 32, or during storms. The ground pad 70 can have any configuration suitable for supporting at least one of the solar panels 30. For example, the ground pad 70 can be a concrete pad disposed in or on the ground, or on a roof of a building.

A mechanism can be provided for securing the solar panel 30 (or the support pole 32) to the ground pad 70. For example, the ground pad 70 can include a ground pad retainer 72 fixed to the ground pad 70, and the solar panel 30 (or the support pole 32) can include a solar panel retainer 74 that is directly engageable with the ground pad retainer 72 to secure the solar panel 30 and/or the support pole 32 to the ground pad 70. The ground pad retainer 72 and the solar panel retainer 74 can have any configurations suitable for securing the solar panel 30 and/or the support pole 32 to the ground pad 70. For example, the ground pad retainer 72 and the solar panel retainer 74 can be a ring (on either the solar panel or the support pole or on the ground pad) and a clamp (on either the ground pad or on the solar panel or the support pole) that clamps to the ring. In an embodiment, two or more of the solar panel assemblies 12 can share a common ground pad 70. In another embodiment, a securing mechanism is not provided and instead the solar panel 30 rests on the ground pad 70 and gravity retains the solar panel 30 in the non-use position.

The term "ground" as used herein, for example when referring to the footing 38 and the ground pad 70, is intended to encompass the surface of the Earth or a structure directly supported on the surface as well as to a roof of a building or any other location where a solar panel assembly 12 or an array of the solar panel assemblies 12 can be mounted.

An example operation of the solar panel system described herein is as follows. This example explanation assumes the solar panel assemblies 12 have a starting position as shown in FIG. 3 where the support poles 32 are generally vertical. Referring to FIGS. 2 and 5, as the sun tracks across the sky, the solar panels 30 are adjusted to keep the solar panels 30 facing toward the sun by suitably tilting the support poles 32. Tilting of the support poles 32 is achieved using the row adjusters 18 and the column adjusters 20 at the ends of the support cables 14, 16 to reel the cables 14, 16 in or out. For example, for any row R, the row adjuster 18 at the left end of the row support cable 14 can reel in the cable 14 while the row adjuster 18 at the other end of the cable 14 reels out the cable 14 and maintains tension on the cable 14. Actuation of each row support cable 14 adjusts the angle of tilt a (FIG. 5) of the support pole 32, and thus the angle of the solar panel 30, of each solar panel assembly 12 in the row R. Separately or simultaneously, for any column C, the column adjuster 20 at the bottom (when viewing FIG. 2) end of the column support cable 16 can reel in the cable 16 while the column adjuster 20 at the other end of the cable 16 reels out the cable 16 and maintains tension on the cable 16. Actuation of each column support cable 16 adjusts the angle of tilt a of the support pole 32, and thus the angle of the solar panel 30, of each solar panel assembly 12 in the column C. The combined actuation of the support cables 14, 16 results in tilting of the support poles 32 to achieve the desired angle of the solar panel 30 in the array 10.

If the solar panel system includes a single solar panel assembly 12, the angle of tilt of the support pole 32, and thus the angle of the solar panel 30, can be controlled by actuating the support cables 14, 16 connected to the support pole 32 using the adjusters 18, 20.

In the event of maintenance, high winds or a storm, the solar panel assemblies 12 can be pivoted to the non-use position and, if necessary, the solar panels 30 can be secured to the ground pads 70.

Figure 7:
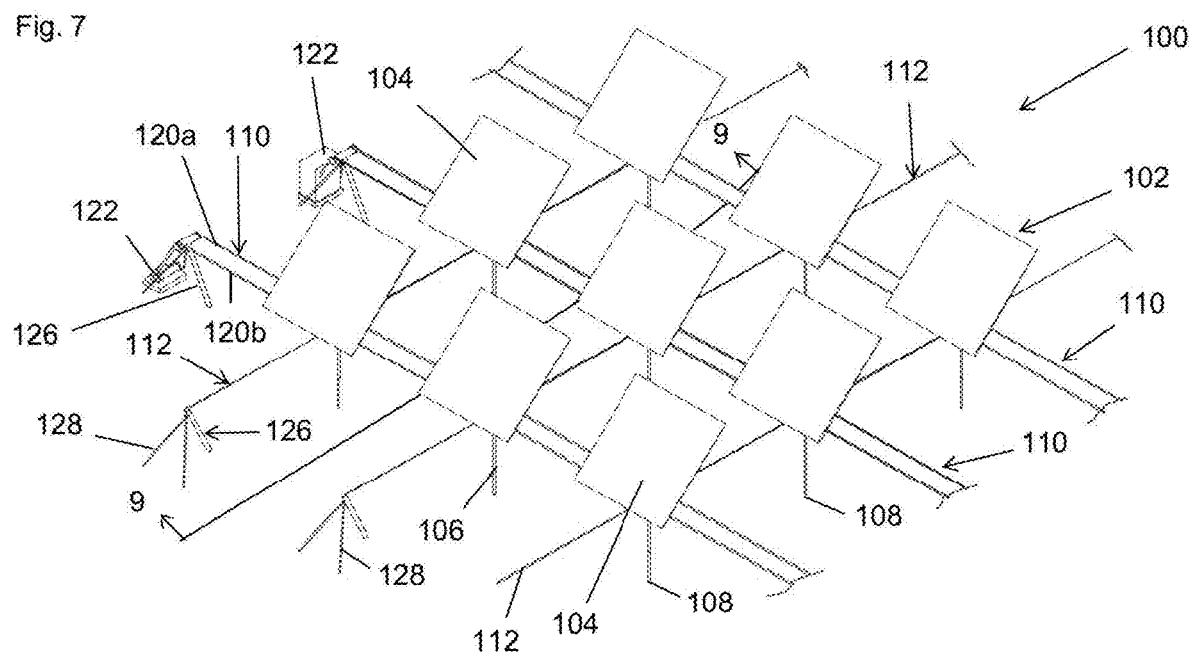
FIG. 7 depicts a portion of another embodiment of an array of solar panel assemblies.
Figure 8:
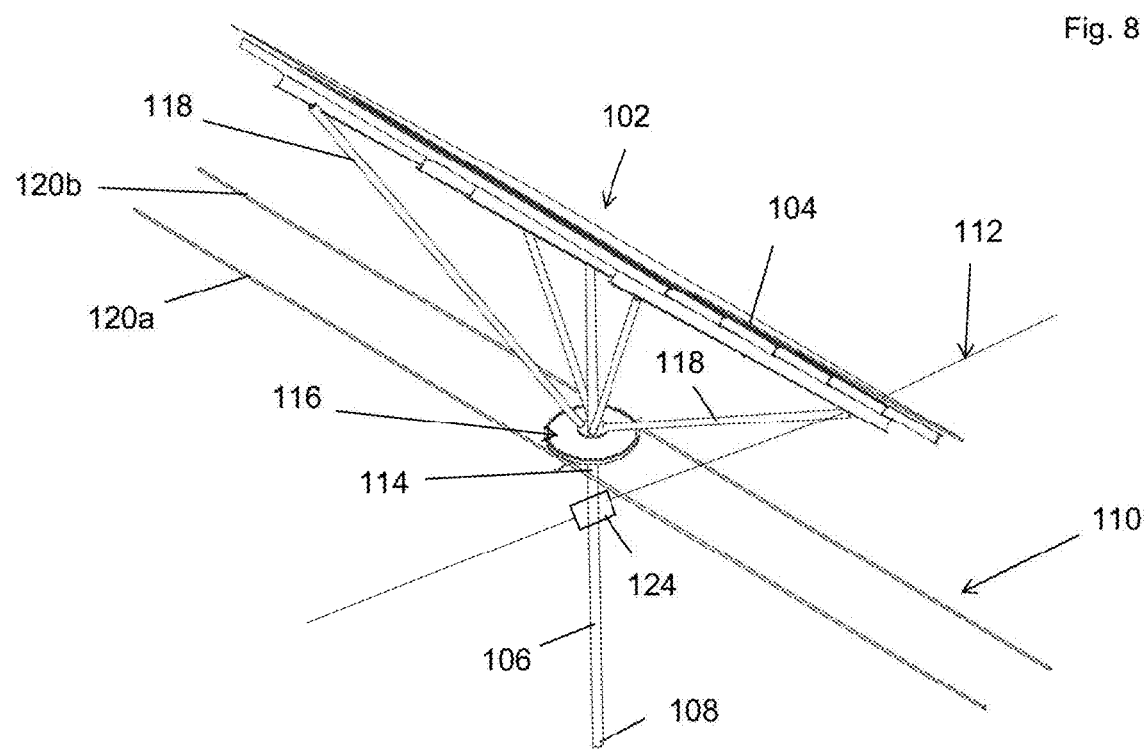
FIG. 8 depicts a more detailed view of connection between the support cables and the support pole.
Figure 9:
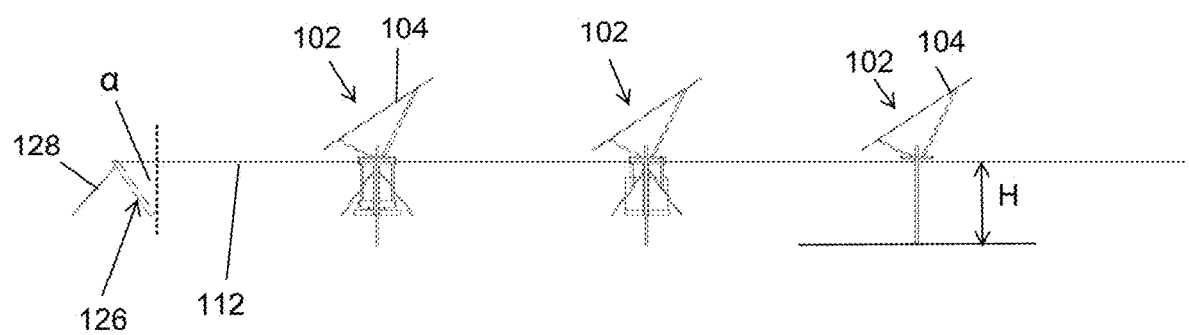
FIG. 9 is a side view taken along line 9-9 of FIG. 7.

FIGS. 7-9 illustrate another example of an array 100 of solar panel assemblies 102 of a solar panel system. Like in FIGS. 1-2, the solar panel assemblies 102 are arranged into a plurality of rows and a plurality of columns. The example depicted in FIG. 7 shows three rows and three columns. However, the array 100 can include a smaller or larger number of rows and columns including a single row with multiple columns and a single column with multiple rows. In addition, in some embodiments, a single one of the solar panel assemblies 102 described herein can be used by itself without any other ones of the solar panel assemblies 102.

Referring to FIGS. 7 and 8, each one of the solar panel assemblies 102 includes a solar panel 104 that is mounted on a support pole 106. The support poles 106 provide vertical support to the solar panels 104. A lower end 108 of each support pole 106 is fixed to a ground support such as a ground footing. In one embodiment, the lower end 108 may be articulated to the ground support to permit the support pole to articulate relative to the ground support. For example, the articulating connection between the lower end 108 and the ground support may be a connection that provides universal articulation of the support pole 106 relative to the ground support.

In addition, each row includes a row support cable 110 that is connected to each one of the support poles 106 therein, and each column includes a column support cable 112 that is connected to each one of the support poles 106 therein. The support cables 110, 112 provide horizontal support to the support poles 106. In an embodiment, the row support cables 110 may also provide east-west adjustment of the solar panels 104 in the respective row to track the sun's daily arc, for example as described above for FIGS. 1-6. In addition, in an embodiment, the column support cables 112 may provide north-south adjustment of the solar panels 104 in the respective column to track the sun's seasonal arc, for example as described above for FIGS. 1-6. The east-west adjustment provided by the cables 110 may be provided while the north-south angle of the solar panels 104 is fixed. Similarly, the north-south adjustment of the solar panels 104 may be provided while the east-west angle of the solar panels 104 is fixed. In addition, both the east-west adjustment and the north-south adjustment may be provided.

As best seen in FIG. 8, an upper or first end 114 of the support pole 106 is connected to a cable retainer 116, and brackets or supports 118 connect the rear side of the solar panel 104 to the cable retainer 112. The cable retainer 116 is mounted so as to be rotatable relative to the support pole 106 about the longitudinal axis of the support pole 106. Rotation of the cable retainer 116 adjusts the east-west angle of the solar panel 104 in order to track the sun's daily arc. Alternatively, the cable retainer 116 can be fixed to the support pole 106 so that the support pole 106, or a portion of the support pole 106, rotates with the cable retainer 116.

The cable retainer 116 can be rotated using any suitable drive mechanism. For example, in the illustrated example, the row support cable 110 causes rotation of the cable retainer 116. In particular, the row support cable 110 comprises a first portion 120a and a second portion 120b. The first and second portions 120a,b are suitably fixed to the cable retainer 116, for example using clamps, such that when the cable portions 120a,b are moved in opposite directions relative to the support poles 106, the cable portions 120a,b drive the cable retainers 116 to rotate, thereby simultaneously adjusting the angles of the solar panels 104 in the associated row.

Referring to FIG. 7, the portions 120a,b can be part of a single common endless cable that is connected to a drive motor 122 at one end or at both ends that drive the cable portions 120a,b in the opposite directions. The drive motor 122 can be at one end of the row with a pulley at the other end, or there can be a drive motor at both ends. Alternatively, the portions 120a,b can be separate cables that are driven by a drive motor at one or both ends of the portions 120a,b.

Returning to FIGS. 7 and 8, a second cable retainer 124 is fixed to the support pole 106. In the illustrated example, the cable retainer 124 is fixed to the support pole 106 at a location below the cable retainer 116. However, the relative locations of the cable retainers 116, 124 can be reversed. The column support cables 112 in each column are fixed to each one of the cable retainers 124 in the column. The column support cables 112 may simply horizontally support the support poles 106. In another embodiment, the support cables 112 may be used to adjust the north-south angle of the solar panels 104 in each column using column adjustors, for example the column adjustors 20 described above with respect to FIGS. 1-6.

Referring to FIGS. 7 and 9, pitch poles 126 may be provided at one or more ends of the support cables 110, 112. The pitch poles 126, if provided, help support the ends of the cables 110, 112 and control the tension in the cables 110, 112. As best seen in FIG. 9, the pitch poles 126 are angled away from the solar panel assemblies 102. For example, the pitch poles 126 can be disposed at an angle $\alpha$ of around 30 degrees from vertical. One or more anchor wires or anchor braces 128 extend from the pitch poles 126 to the ground to help anchor the pitch poles 126 to the ground. The row support cables 110 can pass over the pitch poles 126 before continuing to the drive motors 122. In another embodiment, the row support cables 110 can be attached to the pitch poles 126, which in turn can be actuated by the drive motors 122 or fixed to the ground.

Referring to FIGS. 8 and 9, the use of the support poles 106 and the support cables 110, 112 allow the solar panels 104 to be supported high off the ground. For example, the vertically lowest support cable, which in the illustrated embodiment is the support cable 112, can be located a distance H above the ground. H can be, for example, 8-15 feet above the ground, or 10 feet above the ground. In addition, no portion of the solar panel 104 extends below the support cables 110, 112. As a result, the ground underneath the solar panels 104 can be utilized, for example for animal grazing or growing vegetation such as grass. The height H also permits people, animals and/or vehicles to pass underneath the solar panels 104 and the support cables 110, 112.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A solar panel system, comprising:
a first plurality of solar panel assemblies arranged into an array, each one of the solar panel assemblies includes:
a solar panel having a plurality of photovoltaic cells;
a support pole having a first end attached to the solar panel and a second end that is pivotally mounted to a ground footing via an articulating connection whereby the support pole is able to tilt relative to the ground footing;
an adjustment mechanism that simultaneously adjusts each one of the solar panel assemblies by tilting the support pole of each solar panel assembly, the adjustment mechanism includes:
a first support cable attached to the support poles of the solar panel assemblies, the first support cable having a first end at a first end of the array and a second end at a second end of the array;
a first adjuster at the first end of the array and attached to the first end of the first support cable, and a second adjuster at the second end of the array and attached to the second end of the first support cable, the first adjuster and the second adjuster are configured to adjust the first support cable and thereby simultaneously adjust tilt angles of the support poles relative to their respective ground footings.

2. The solar panel system of claim 1, wherein, for each one of the solar panel assemblies, the first end of the support pole is attached to the solar panel by an articulated connection that permits the solar panel to articulate relative to the support pole.

3. The solar panel system of claim 1, further comprising a ground pad, a ground pad retainer fixed to the ground pad, and a solar panel retainer fixed to the solar panel of at least one of the solar panel assemblies that is directly engageable with the ground pad retainer.

4. The solar panel system of claim 1, further comprising, for each one of the solar panel assemblies, a first cable retainer mounted on the support pole and a second cable retainer mounted on the support pole, wherein the first cable retainer and the second cable retainer are spaced from one another in a longitudinal direction of the support pole.

5. The solar panel system of claim 1, further comprising a second plurality of the solar panel assemblies arranged into an array; and
a second adjustment mechanism that simultaneously adjusts each one of the solar panel assemblies by tilting the support pole of each solar panel assembly of the second plurality, the second adjustment mechanism includes:
a second support cable attached to the support poles of the solar panel assemblies of the second plurality, the second support cable having a first end at a first end of the second plurality and a second end at a second end of the second plurality;
a third adjuster at the first end of the second plurality and attached to the first end of the second support cable, and a fourth adjuster at the second end of the second plurality and attached to the second end of the second support cable, the third adjuster and the fourth adjuster are configured to adjust the second support cable and thereby simultaneously adjust tilt angles of the support poles of the second plurality relative to their respective ground footings.

6. The solar panel system of claim 5, wherein the first support cable and the second support cable are arranged relative to one another at an angle of at least 45 degrees and less than about 135 degrees.

7. The solar panel system of claim 6, wherein the angle is about 90 degrees.

8. The solar panel system of claim 1, wherein the solar panel of each solar panel assembly is mounted to permit each solar panel to track the sun's daily arc and seasonal arc.

9. The solar panel system of claim 1, wherein the array comprises a row.

10. The solar panel system of claim 1, wherein the array comprises a column.

* * * * *